(12) United States Patent
Ho

(10) Patent No.: US 12,489,230 B2
(45) Date of Patent: Dec. 2, 2025

(54) ELECTRICAL CONNECTOR

(71) Applicant: LOTES CO., LTD, Keelung (TW)

(72) Inventor: Chien Chih Ho, Keelung (TW)

(73) Assignee: LOTES CO., LTD, Keelung (TW)

( * ) Notice: Subject to any disclaimer, the term of this patent is extended or adjusted under 35 U.S.C. 154(b) by 309 days.

(21) Appl. No.: 18/228,074

(22) Filed: Jul. 31, 2023

(65) Prior Publication Data

US 2024/0097364 A1 Mar. 21, 2024

(30) Foreign Application Priority Data

Sep. 19, 2022 (CN) .......................... 202211147644.4

(51) Int. Cl.
*H01R 12/70* (2011.01)
*H01R 12/71* (2011.01)

(52) U.S. Cl.
CPC ......... *H01R 12/707* (2013.01); *H01R 12/716* (2013.01)

(58) Field of Classification Search
CPC .... H01R 12/707; H01R 12/712; H01R 13/24; H01R 13/41
See application file for complete search history.

(56) References Cited

U.S. PATENT DOCUMENTS

| | | | |
|---|---|---|---|
| 2012/0196485 A1* | 8/2012 | Tsai | H01R 12/55 439/660 |
| 2021/0175656 A1* | 6/2021 | Ho | H01R 13/2485 |

FOREIGN PATENT DOCUMENTS

| | | |
|---|---|---|
| CN | 201515030 U | 6/2010 |
| CN | 202067913 U | 12/2011 |
| CN | 112103682 B | 12/2021 |

* cited by examiner

*Primary Examiner* — Sean Gugger
(74) *Attorney, Agent, or Firm* — Troutman Pepper Locke LLP; Tim Tingkang Xia, Esq.

(57) ABSTRACT

An electrical connector includes an insulating body, a plurality of terminals and a plurality of solder balls. Each terminal has a flat plate portion and two first soldering portions. A receiving slot is formed between the two first soldering portions. Two second soldering portions extend toward each other from lower ends of the two first soldering portions. Each of end portions of the two second soldering portion facing each other respectively bends toward a direction away from a corresponding solder ball to form a bending section. A plate surface of the bending section facing the corresponding solder ball is defined as a matching surface. Along a direction away from the corresponding solder ball, a gap between the two matching surfaces of each terminal becomes smaller. The corresponding solder ball is partially accommodated between the receiving slot and the two matching surfaces. The matching surface abuts against the corresponding solder ball.

10 Claims, 16 Drawing Sheets

B-B

D-D

ELECTRICAL CONNECTOR

CROSS-REFERENCE TO RELATED PATENT APPLICATION

This non-provisional application claims priority to and the benefit of, pursuant to 35 U.S.C. § 119(a), patent application Serial No. CN202211147644.4 filed in China on Sep. 19, 2022. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector electrically connecting a chip module and a circuit board.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Chinese Patent Application No. 201120031855.2 discloses an electrical connector, which has an insulating body and a plurality of terminals. The insulating body is provided with a plurality of accommodating slots, and at least one side surface of each accommodating slot is formed with a stopping wall. Each terminal has a base portion, two fixing portions extending downward from the base portion, and two soldering portions bending toward each other and extending from the two fixing portions. The two soldering portions and the stopping wall altogether clamp a solder ball. Each soldering portion includes a soldering arm and a hook portion extending downward from the soldering arm. The hook portion abuts against a lower hemispherical surface of the solder ball. Since the hook portion extends downward from the soldering arm, it increases a height of the whole terminal structure, which is not conducive to the ultra-thin development of the electrical connector.

Therefore, a heretofore unaddressed need to design an electrical connector exists in the art to address the aforementioned deficiencies and inadequacies.

SUMMARY

The present invention is directed to an electrical connector, which has terminals stably abutting against solder balls and prevents the terminals from moving upward.

To achieve the foregoing objective, the present invention adopts the following technical solutions.

An electrical connector includes: an insulating body, having a plurality of accommodating slots running therethrough along a vertical direction, wherein a side surface of each of the accommodating slots is provided with a stopping block; and a plurality of terminals and a plurality of solder balls, correspondingly accommodated in the accommodating slots respectively, wherein each of the terminals has a flat plate portion located in a corresponding accommodating slot of the accommodating slots and two first soldering portions extending downward from the flat plate portion and abreast, a receiving slot is formed between the two first soldering portions, the flat plate portion and the two first soldering portions are coplanar, two second soldering portions extend toward each other from lower ends of the two first soldering portions, each of end portions of the two second soldering portion facing each other respectively bends toward a direction away from a corresponding solder ball of the solder balls to form a bending section, the bending section is located below the receiving slot and is connected to the receiving slot, a plate surface of the bending section facing the corresponding solder ball is defined as a matching surface, along the direction away from the corresponding solder ball, a gap between the two matching surfaces of the two bending sections of the two second soldering portions of each of the terminals becomes smaller, the corresponding solder ball is partially accommodated between the receiving slot and the two matching surfaces of the two bending sections of the two second soldering portions, the matching surface abuts against the corresponding solder ball and is located below a horizontal central plane of the corresponding solder ball, and the stopping block of the corresponding accommodating slot is located above the bending section to stop the bending section from moving upward.

In certain embodiments, the two bending sections of the two second soldering portions of each of the terminals abut against each other.

In certain embodiments, prior to bending the bending section, the two first soldering portions are close to each other along a downward direction from top thereof.

In certain embodiments, a top surface and a bottom surface of each of the two second soldering portions both bend to form the bending section.

In certain embodiments, bending locations of the two bending sections of the two second soldering portions of each of the terminals are close to each other along a downward direction from top thereof, and top surfaces of the two bending sections of the two second soldering portions of each of the terminals are separate from each other.

In certain embodiments, each of the accommodating slots comprises a first accommodating slot and a second accommodating slot, the first accommodating slot runs vertically through the insulating body, the second accommodating slot runs downward through the insulating body, each of the terminals is accommodated in the first accommodating slot of the corresponding accommodating slot, each of the solder balls is accommodated in the second accommodating slot of the corresponding accommodating slot, the insulating body is provided with a chamfer located between the first accommodating slot and the second accommodating slot, the first accommodating slot and the second accommodating slot are in communication with each other below the chamfer, the chamfer has a first side surface and a second side surface, the first side surface is connected to the first accommodating slot, the second side surface is connected to the second accommodating slot, and an included angle between the first side surface and the second side surface is less than or equal to 30°.

In certain embodiments, the stopping block is provided with a guiding surface being obliquely downward, the guiding surface guides each of the terminals to move downward, and a lowest position of the guiding surface is lower than a lowest position of the chamfer.

In certain embodiments, an elastic arm bends from the flat plate portion and extends upward, a contact portion is formed by extending upward from the elastic arm, and the contact portion is located in front of the flat plate portion; the insulating body has an oblique surface in front of the accommodating slots, the oblique surface is located right below the elastic arm, and the oblique surface gradually becomes higher along a forward direction from rear thereof.

In certain embodiments, each of the accommodating slots is provided with a stopping wall, the stopping wall is opposite to the stopping block, and the stopping wall and the two matching surfaces altogether abut against the corresponding solder ball.

In certain embodiments, the electrical connector is soldered to a circuit board, the circuit board is provided with a plurality of metal pads, the solder balls are soldered to the metal pads, a vertical central line of each of the metal pads is located between a vertical central line of each of the solder balls and one of the first soldering portions.

Compared with the related art, certain embodiments of the present invention have the following beneficial effects: each of the end portions of the two second soldering portions facing each other respectively bends toward a direction away from the corresponding solder ball to form a bending section to abut against the corresponding solder ball, which is equivalent to the terminal forming a V-shaped structure to abut against the solder ball, and the bending section abuts against the lower hemispherical surface of the corresponding solder ball, thereby ensuring the bending section to stably abut against the solder ball, and the solder ball does not easily fall. Meanwhile, the stopping block downward stops the bending section, and in assembling the solder ball, it may prevent the terminal from moving upward and detaching from the insulating body. Since the bending section is connected to the receiving slot, the height of the terminal is reduced. Moreover, the bending section abuts against the solder ball and is stopped by the stopping block to prevent the terminal from moving upward. In other words, the terminal utilizes one portion to facilitate two functions, thereby reducing the volume of the terminal.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
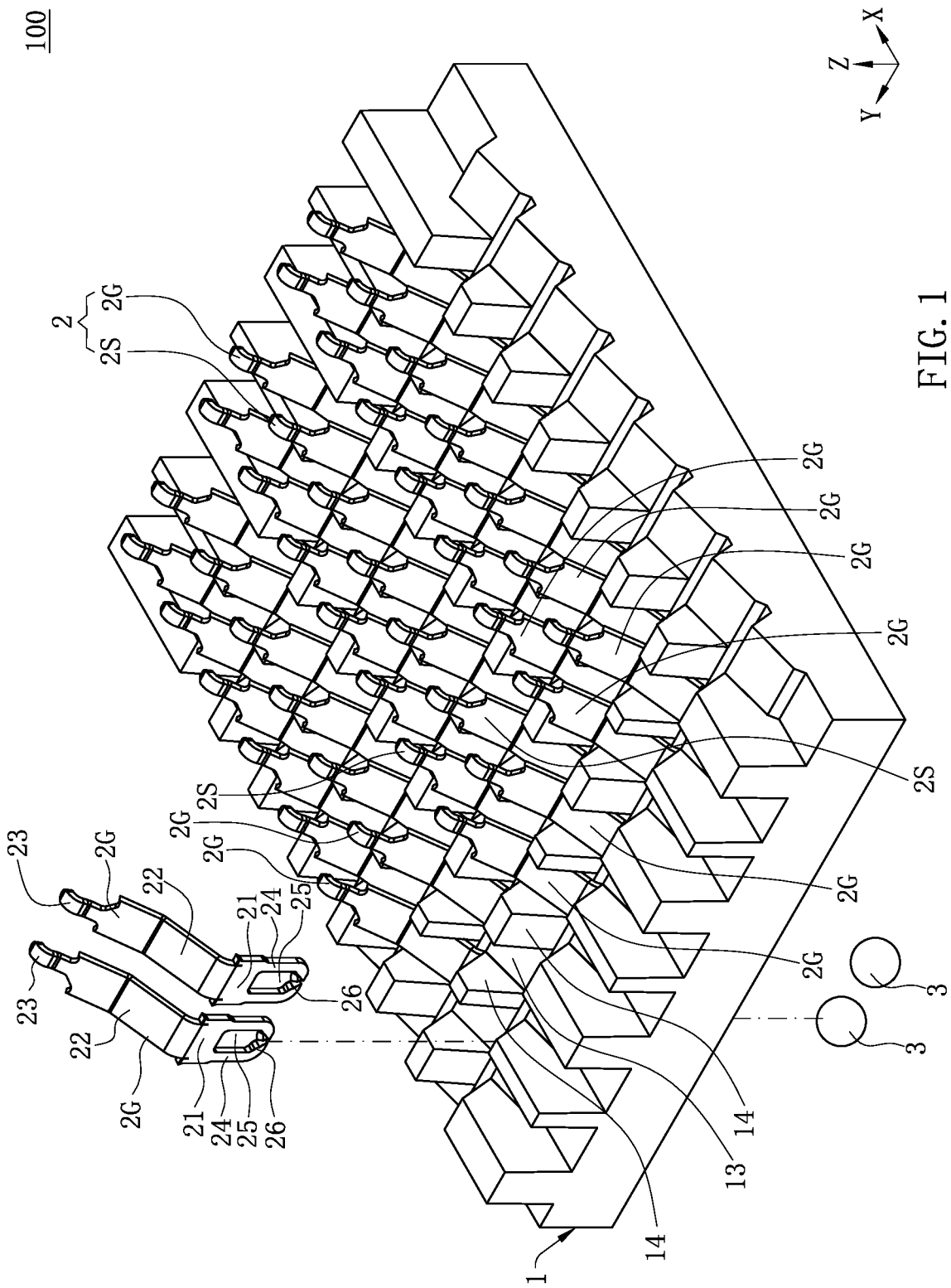
FIG. 1 is an exploded view of an electrical connector according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-16. In accordance with the purposes of this invention, as embodied and broadly described herein, this invention, in one aspect, relates to an electrical connector.

To provide accurate descriptions, when directions are described in the disclosure, an extending direction of an X-axis is a front-rear direction (where a positive direction of the X-axis is the front direction), an extending direction of a Y-axis is a left-right direction (where a positive direction of the Y-axis is the right direction), and an extending direction of a Z-axis is a vertical direction (where a positive direction of the Z-axis is the upward direction).

Figure 2:
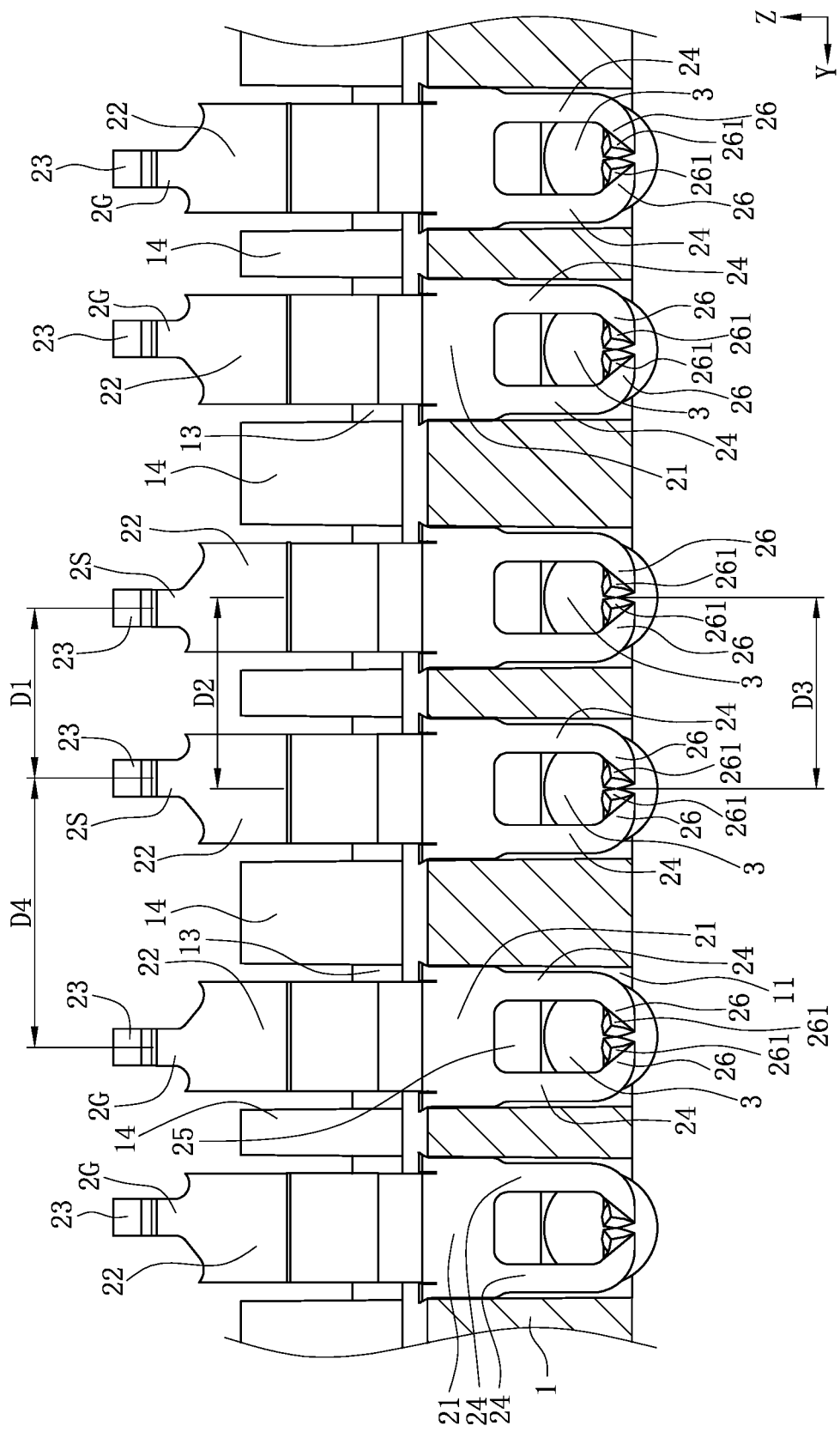
FIG. 2 is a sectional view of an electrical connector according to the first embodiment of the present invention.
Figure 3:
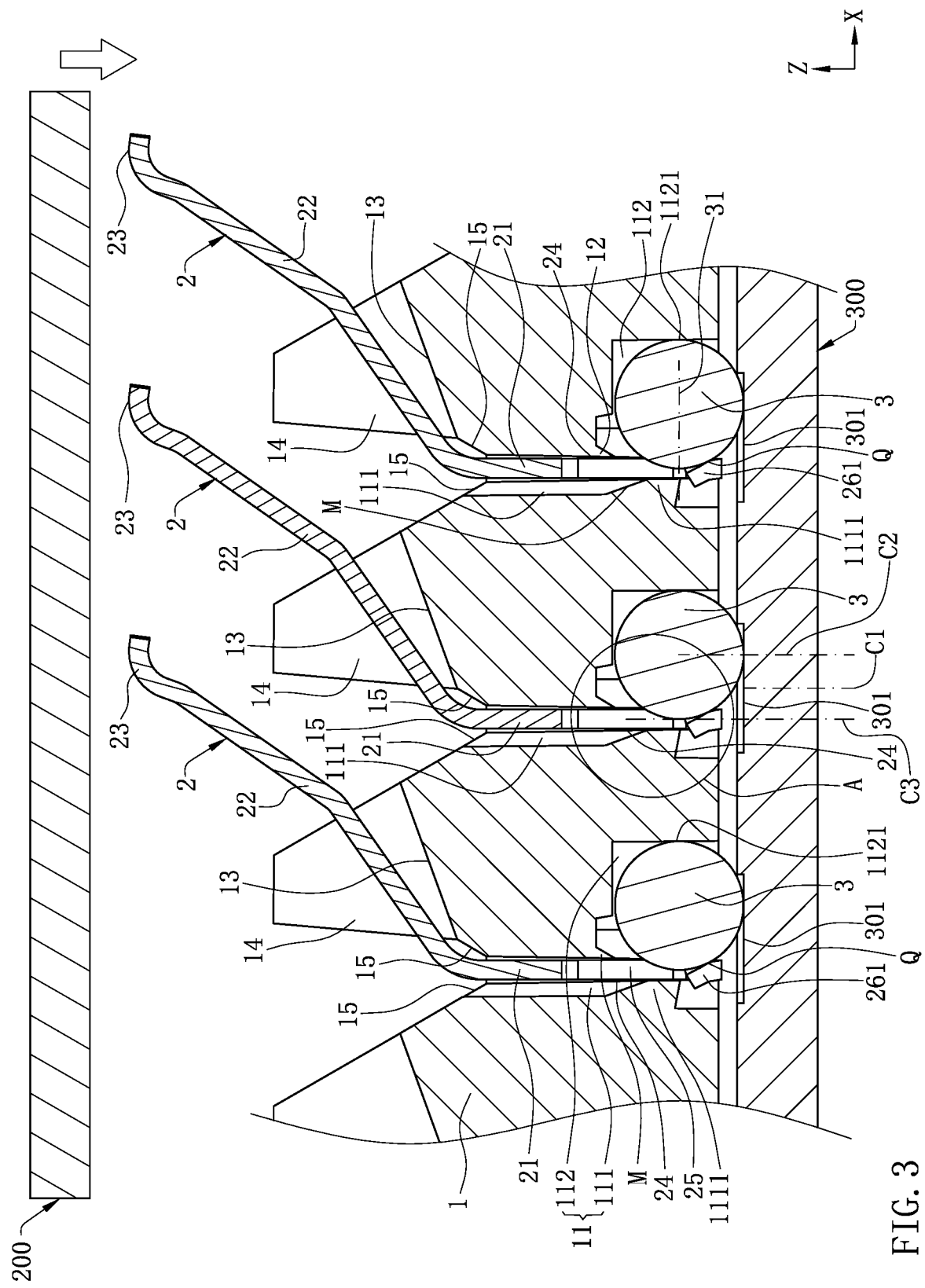
FIG. 3 is a sectional view of an electrical connector according to the first embodiment of the present invention being mounted on a circuit board and to be mounted with a chip module in another viewing angle.
Figure 4:
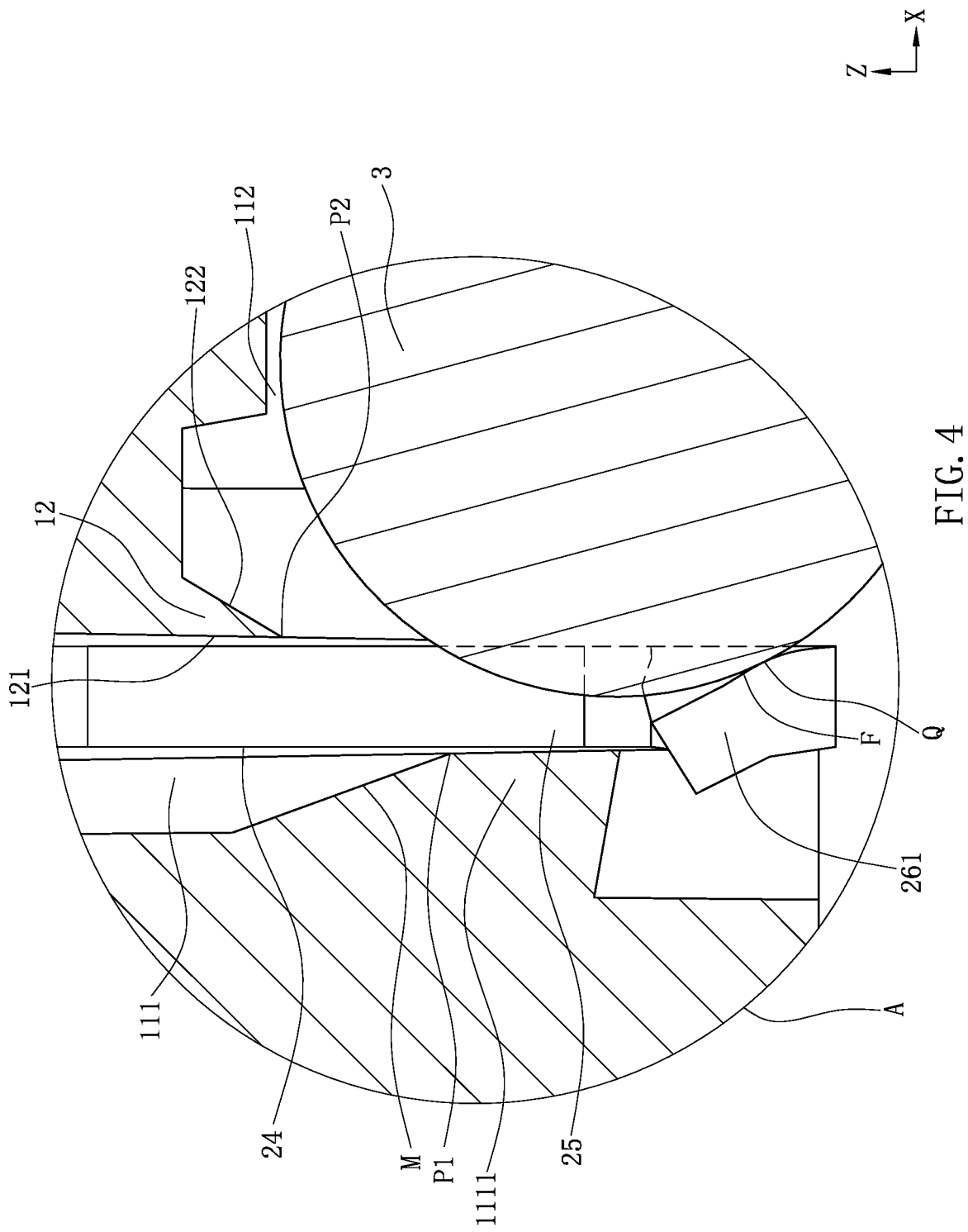
FIG. 4 is an enlarged view of a location A in FIG. 3.
Figure 8:
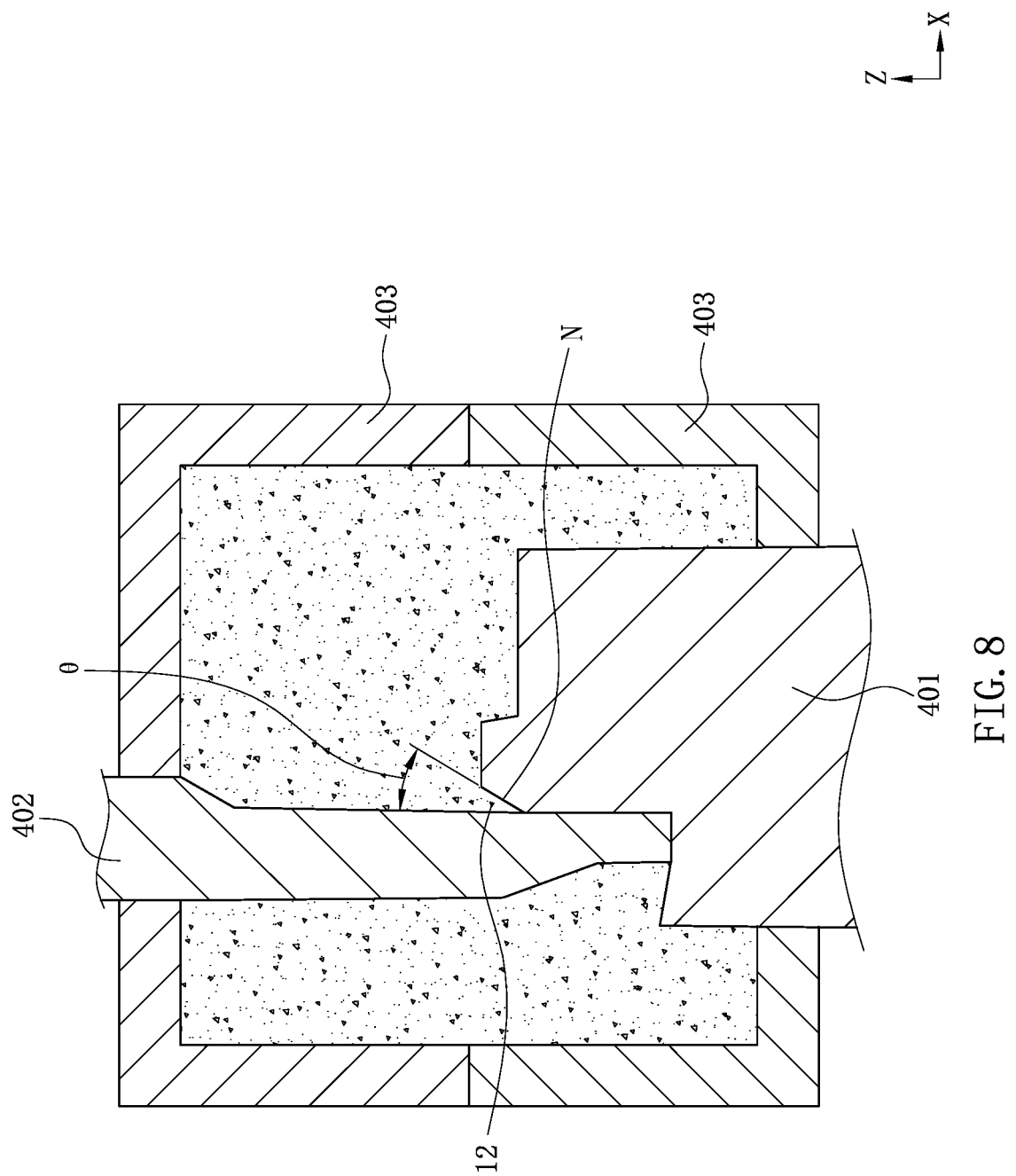
FIG. 8 is a schematic view of forming a first accommodating slot, a second accommodating slot and a chamfer when insert-molding an insulating body of an electrical connector according to the first embodiment of the present invention.
Figure 9:
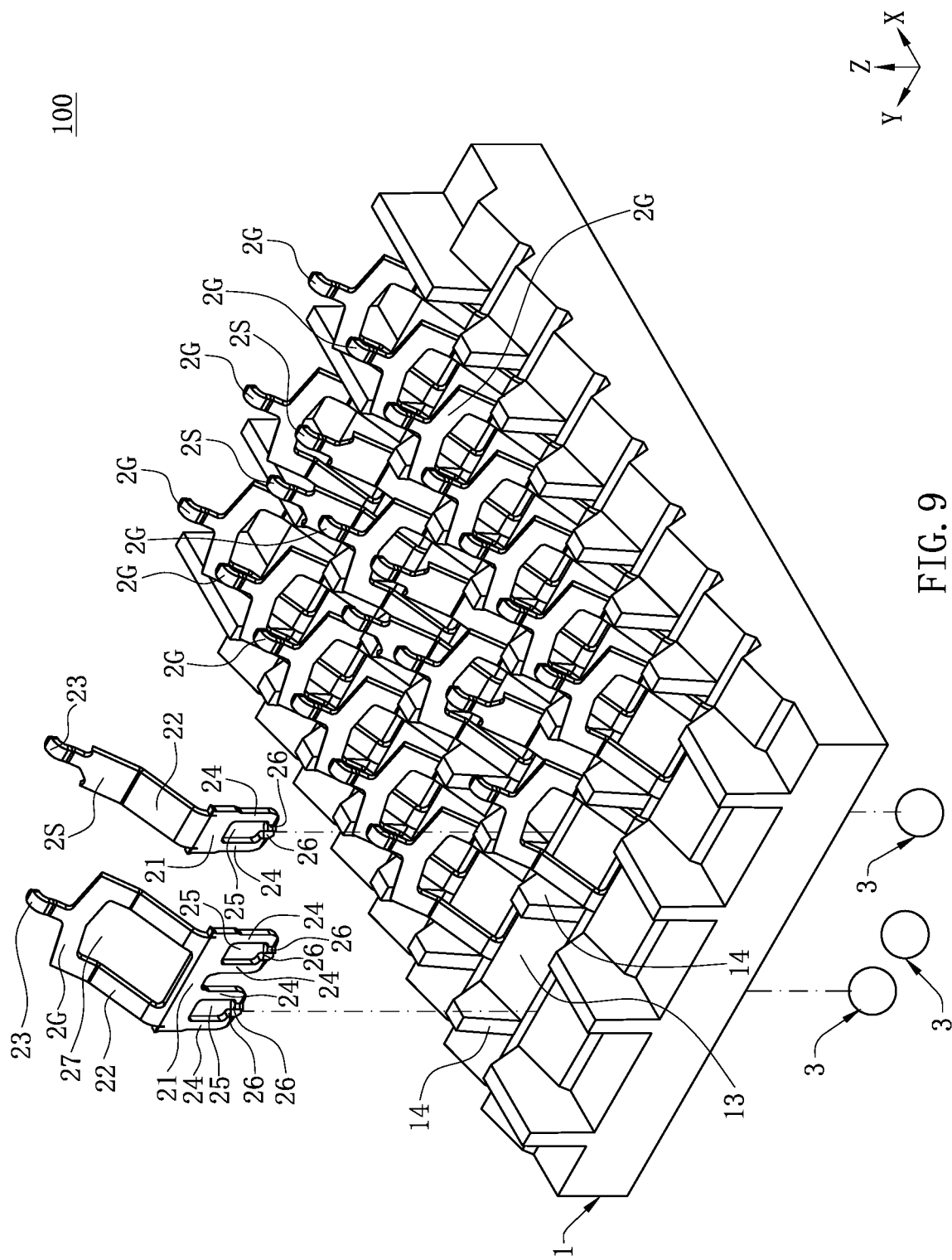
FIG. 9 is an exploded view of an electrical connector according to a second embodiment of the present invention.

FIG. 1 to FIG. 4 show an electrical connector 100 according to a first embodiment of the present invention. The electrical connector 100 is used to be electrically connected to a chip module 200 and a circuit board 300, and includes an insulating body 1, a plurality of terminals 2 and a plurality of solder balls 3. The terminals 2 include a plurality of differential signal terminals 2S and a plurality of ground terminals 2G. The insulating body 1 has a plurality of accommodating slots 11, and each accommodating slot 11 includes a first accommodating slot 111 and a second accommodating slot 112. The first accommodating slot 111 and the second accommodating slot 112 are in communication with each other. The first accommodating slot 111 runs vertically through the insulating body 1, and a terminal 2 is correspondingly accommodated in the first accommodating slot 111. A solder ball 2 is correspondingly accommodated in the second accommodating slot 112. The first accommodating slot 111 is protrudingly provided with a stopping block 1111, and the stopping block 1111 is provided with a guiding surface M being obliquely downward. The insulating body 1 is provided with a chamfer 12 located between the first accommodating slot 111 and the second accommodating slot 112. The chamfer 12 has a first side surface 121 and a second side surface 122. The first side surface 121 is connected to the first accommodating slot 111, and the second side surface 122 is connected to the second accommodating slot 112. An included angle between the first side surface 121 and the second side surface 122 is less than or equal to 30°. (As shown in FIG. 8, in the present embodiment, the included angle between the first side surface 121 and the second side surface 122 is 30°. That is, 0=30°.) As shown in FIG. 4, a lowest position P1 of the guiding surface M is lower than a lowest position P2 of the chamfer 12. The chamfer 12 is generated due to a lower mold core 401 being provided with an inclined surface N. Specifically, as shown in FIG. 8, in the process of insert-molding the insulating body 1, the lower mold core 401 is firstly assembled. The lower mold core 401 occupies the second accommodating slot 112, and the lower mold core 401 is provided with the inclined surface N. Then, an upper mold core 402 is assembled, and the inclined surface N guides the upper mold core 402 to move downward and enter the first accommodating slot 111. Since the inclined surface N guides the upper mold core 402 to move downward, it may prevent the upper mold core 402 from being deviated from its assembly position, thereby ensuring the upper mold core 402 and the lower mold core 401 not to collide and be damaged. Meanwhile, the included angle between the first side surface 121 and the second side surface 122 of the chamfer 12 is less than or equal to 30°, which is convenient for the lower mold core 401 to retreat from the mold 403 in the demolding process. The second accommodating slot 112 is provided with a stopping wall 1121. The stopping wall 1121 and the stopping block 1111 are provided on two inner walls of the accommodating slot 11 opposite to each other. The insulating body 1 is provided with an oblique surface 13 in front of the first accommodating slot 111, and the oblique surface 13 gradually becomes higher along a forward direction from rear thereof. Each of a left side and a right side of the oblique surface 13 is connected to a supporting block 14, and a top surface of the supporting block 14 is higher than the oblique surface 13. The supporting blocks 14 are used to support the chip module 200. An upper end of the first accommodating slot 111 has a guiding surface 15, which is used to guide the terminal to insert downward into the first accommodating slot 111. A front end and a rear end of the oblique surface 13 are respectively connected to the guiding surface 15.

Figure 5:
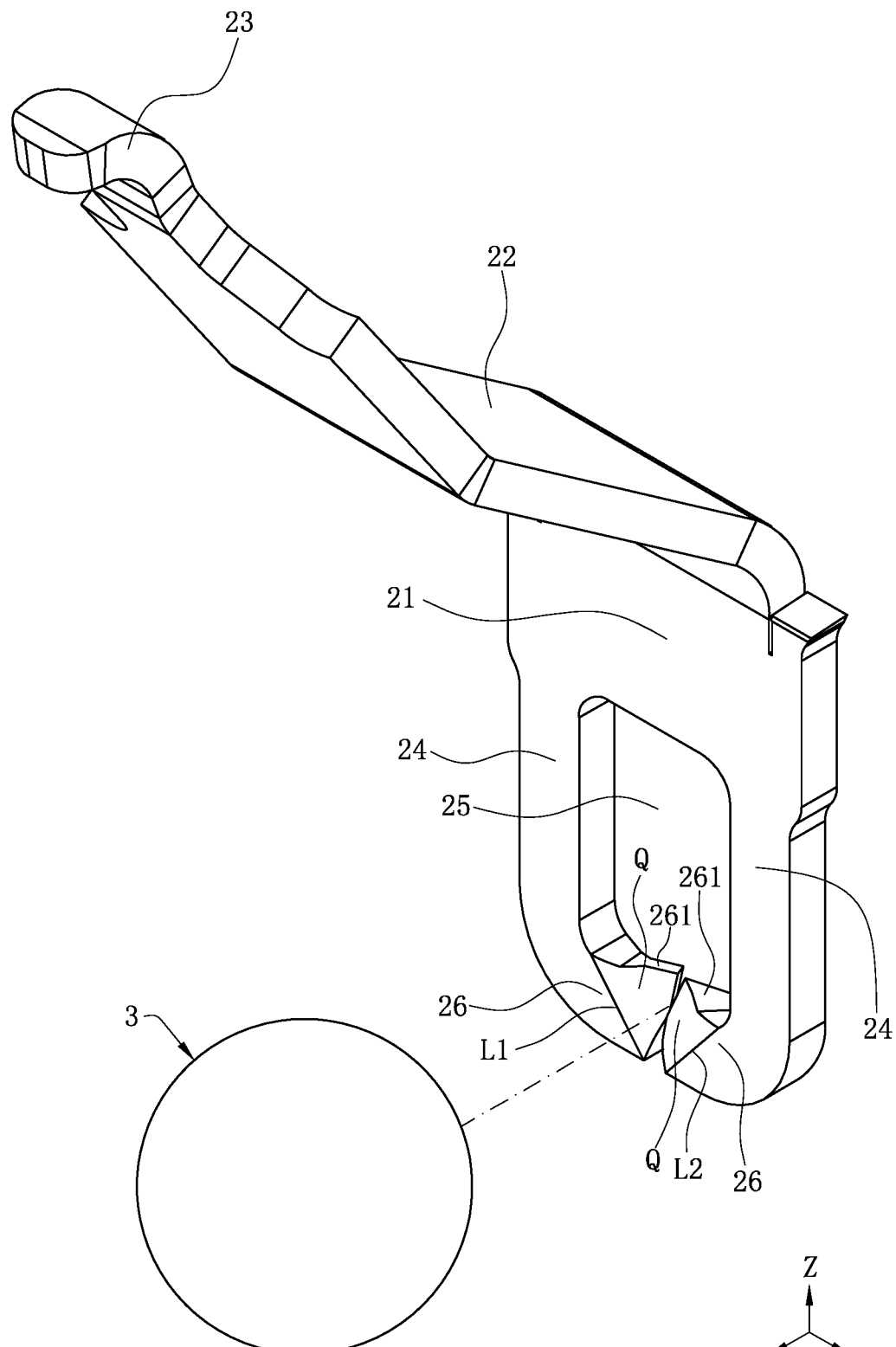
FIG. 5 is a perspective exploded view of a terminal and a solder ball of an electrical connector according to the first embodiment of the present invention.
Figure 6:
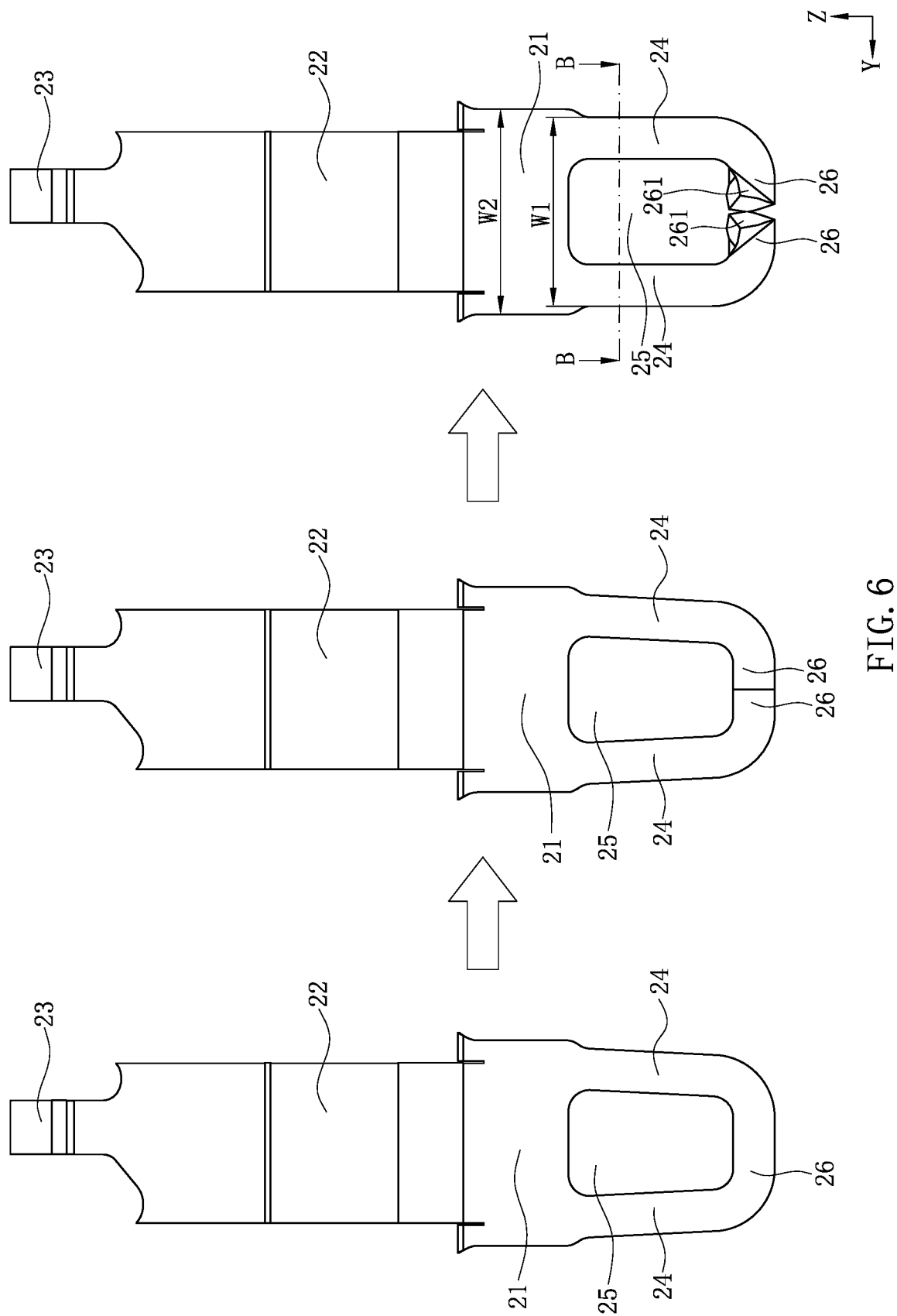
FIG. 6 is a schematic view of a bending process of the bending sections of a terminal of an electrical connector according to the first embodiment of the present invention.
Figure 7:
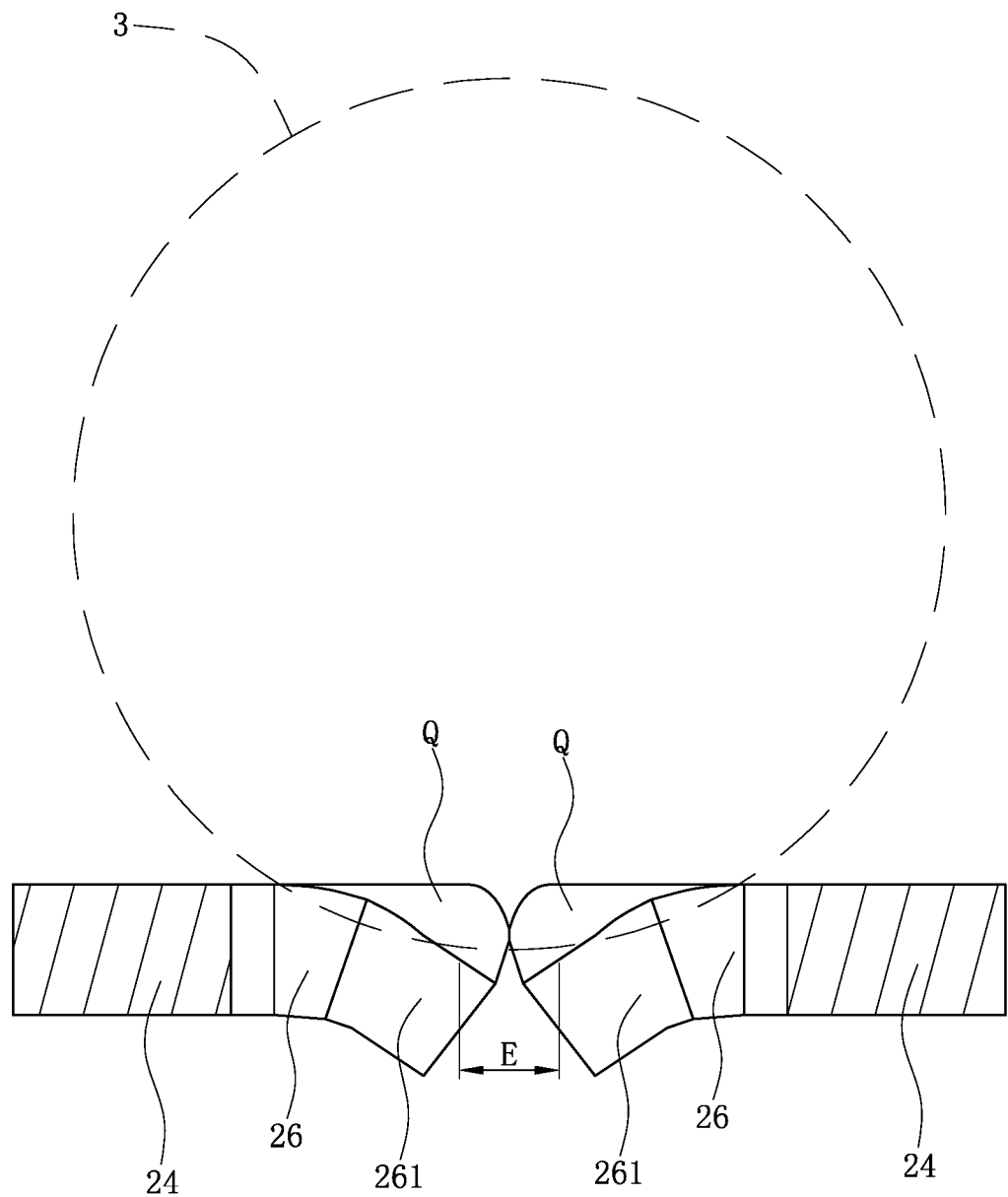
FIG. 7 is a sectional view of FIG. 6 along a B-B direction.

As shown in FIG. 5 to FIG. 6, each terminal 2 has a flat plate portion 21, and an elastic arm 22 bends from the flat plate portion 21 and extends upward. The oblique surface 13 is located right below the elastic arm 22, and the oblique surface 13 rises as the elastic arm 22 rises. A contact portion 23 is formed by extending upward from the elastic arm 22, and the contact portion 23 is located in front of the flat plate portion 21. The contact portion 23 is used to upward abut against the chip module 200. As shown in FIG. 2, for a pair of the differential signal terminals 2S, a distance between central lines of the two contact portions 23 thereof is defined as a first distance D1, a distance between central lines of the two elastic arms 22 thereof is defined as a second distance D2, and a distance between centers of the two solder balls 3 being in contact therewith is defined as a third distance D3. The first distance D1 is less than the second distance D2 and the third distance D3, and the first distance D1 is less than a distance D4 between the contact portion 23 of one differential signal terminal 2S and the contact portion 23 of a ground terminal 2G adjacent thereto (that is, D1<D4). The first distance D1 is less than the second distance D2, such that the contact portions 23 of the pair of the differential signal terminals 2S are tightly coupled, thereby reducing the crosstalk between the two pairs of the differential signal terminals 2S. Two first soldering portions 24 extend downward from the flat plate portion 21 and are abreast, and a receiving slot 25 is formed between the two first soldering portions 24. The two first soldering portions 24 are both flat plate shaped and are coplanar to the flat plate portion 21. Two second soldering portions 26 extend toward each other from lower ends of the two first soldering portions 24. Each of the end portions of the two second soldering portions 26 facing each other respectively bends toward a direction away from the corresponding solder ball 3 to form a bending section 261, and the bending section 261 is located below the receiving slot 25 and is connected to the receiving slot 25. As shown in FIG. 6, prior to bending the bending section 261, the two first soldering portions 24 are close to each other along a downward direction from top thereof (in other words, along the downward direction from top thereof, a distance between the two first soldering portions 24 is gradually reduced), and the second soldering portions 26 are broken through a knife or a scissor to form a gap therebetween, and then the second soldering portions 26 bend to form the bending sections 261. In this case, the two bending sections 261 of each terminal 2 abut against each other along the left-right direction, and the two first soldering portions 24 expand outward, but a maximum distance W1 between the outer side edges of the two first soldering portions 24 in the left-right direction is still less than a width W2 of the flat plate portion 21. Bending locations of the two bending sections 261 of each terminal 2 are close to each other along a downward direction from top thereof (as shown by the lines L1, L2 in FIG. 5, in other words, the bending section 261 is formed by bending a corner of the second soldering portion 26), and top surfaces of the two bending sections 261 of each terminal 2 are separate from each other. A plate surface of the bending section 261 facing the corresponding solder ball 3 is defined as a matching surface Q. As shown in FIG. 7, along the direction away from the corresponding solder ball 3, a gap E between the two matching surfaces Q of each terminal 2 becomes smaller, and along a downward direction from top thereof, the matching surface Q is not a vertical surface, and is oblique and close toward the solder ball 3, as shown by the line F in FIG. 4. The corresponding solder ball 3 is partially accommodated between the receiving slot 25 and the two matching surfaces Q. The matching surface Q abuts against the corresponding solder ball 3 and is located below a horizontal central plane 31 of the corresponding solder ball 3, thereby increasing the abutting force of the matching surface Q to the solder ball 3. The bending section 261 is downward stopped by the stopping block 1111 of a corresponding accommodating slot 11.

As shown in FIG. 3, an upper surface of the circuit board 300 is provided with a plurality of metal pads 301, and the solder balls 3 are soldered to the metal pads 301. A vertical central line C1 of each metal pad 301 is located between a vertical central line C2 of a corresponding solder ball 3 and a vertical central line C3 of one of the first soldering portions 24. Prior to the metal pads 301 being soldered to the solder balls 3, a layer of solder paste is firstly brushed on each metal pad 301. The solder paste contains flux, and in the heating and soldering process, the flux may remove the oxide on the bending section 261, thus achieving a cleaning effect. In the present embodiment, the metal pad 301 is close to one of the first soldering portion 24, such that more oxides on the bending section 261 may be removed, thereby improving the solderability of the bending section 261, and ensuring the firm soldering of the bending section 261 and the solder ball 3.

Figure 10:
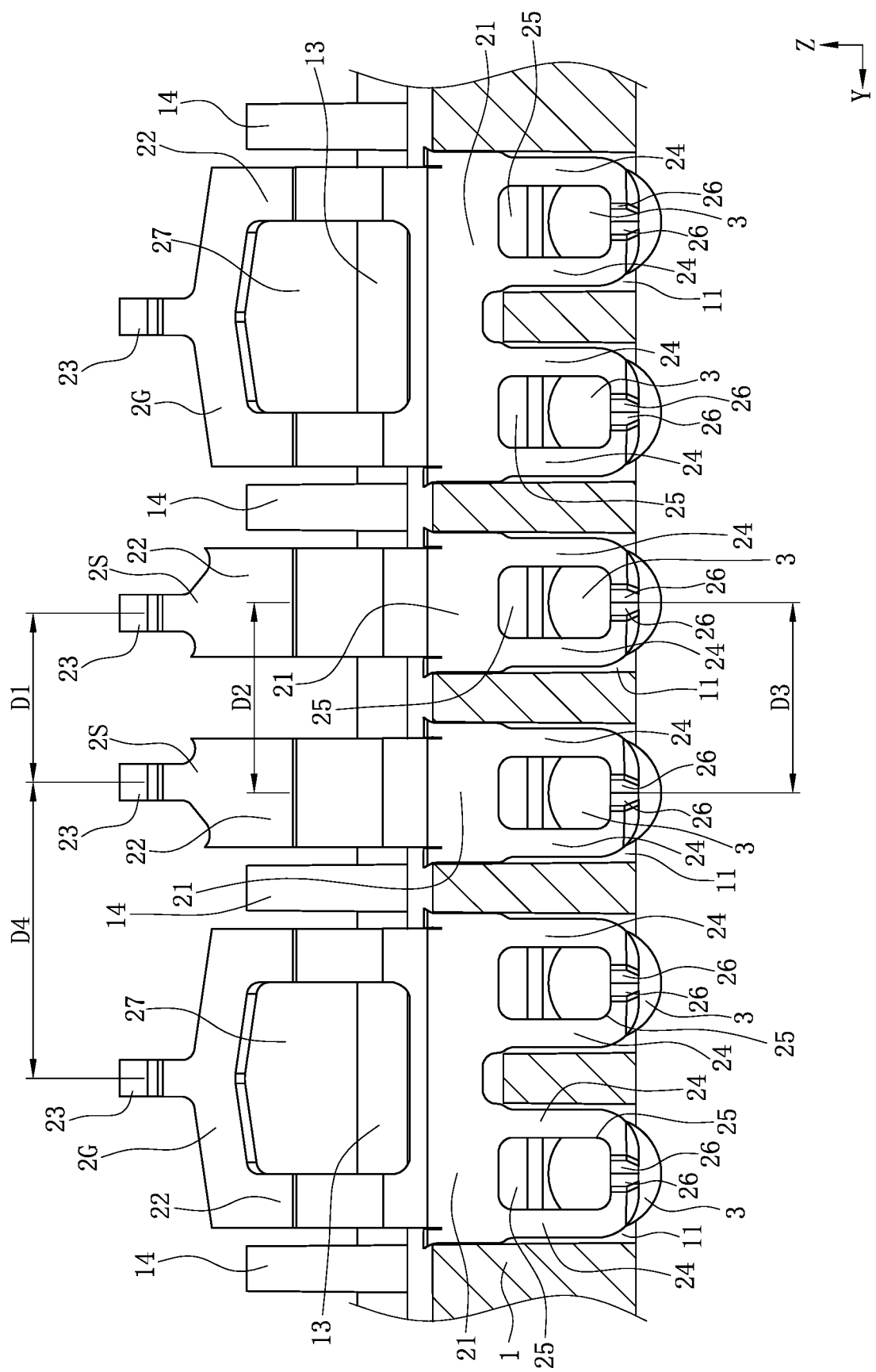
FIG. 10 is a sectional view of an electrical connector according to the second embodiment of the present invention.
Figure 11:
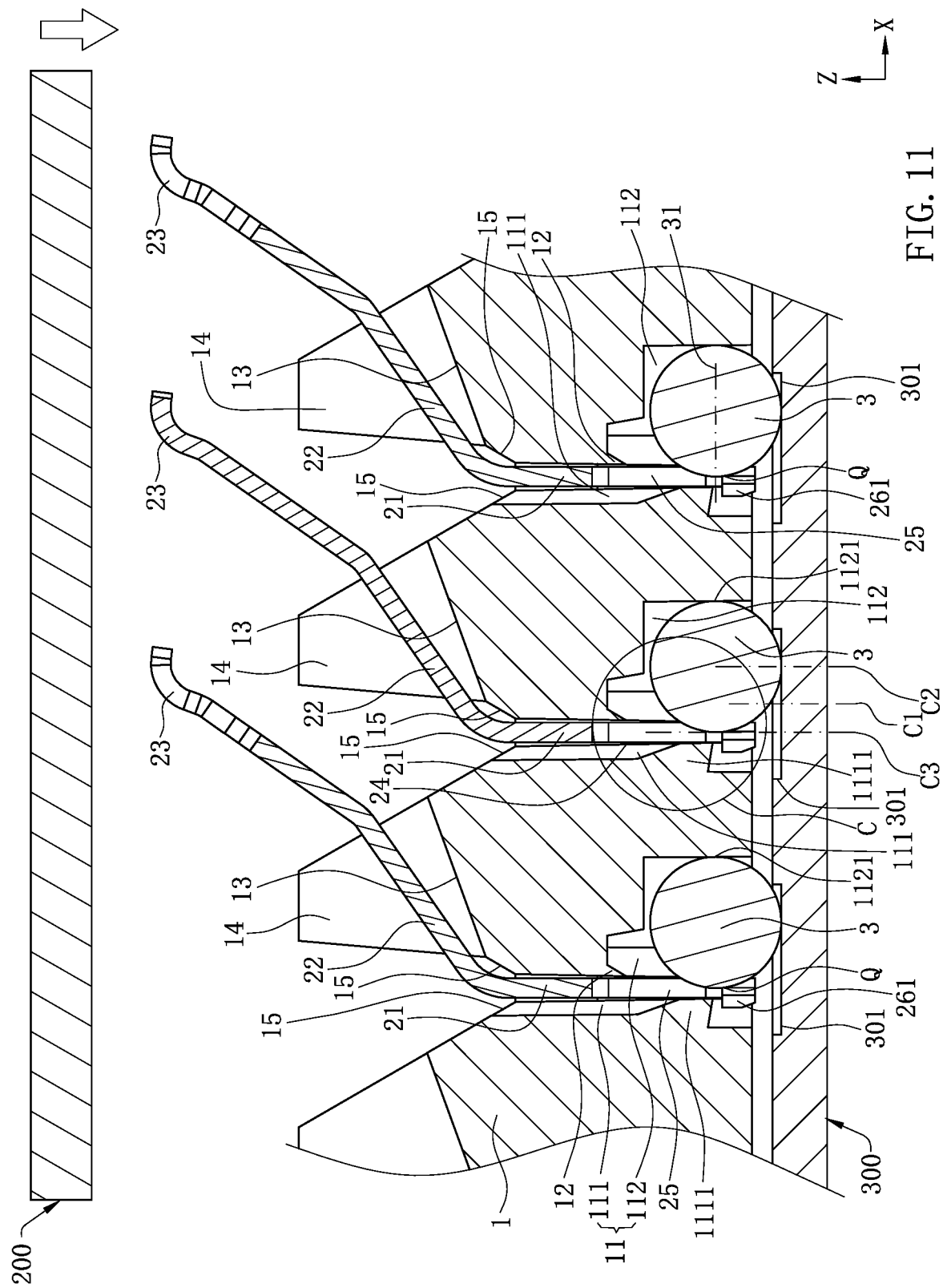
FIG. 11 is a sectional view of an electrical connector according to the second embodiment of the present invention being mounted on a circuit board and to be mounted with a chip module in another viewing angle.
Figure 12:
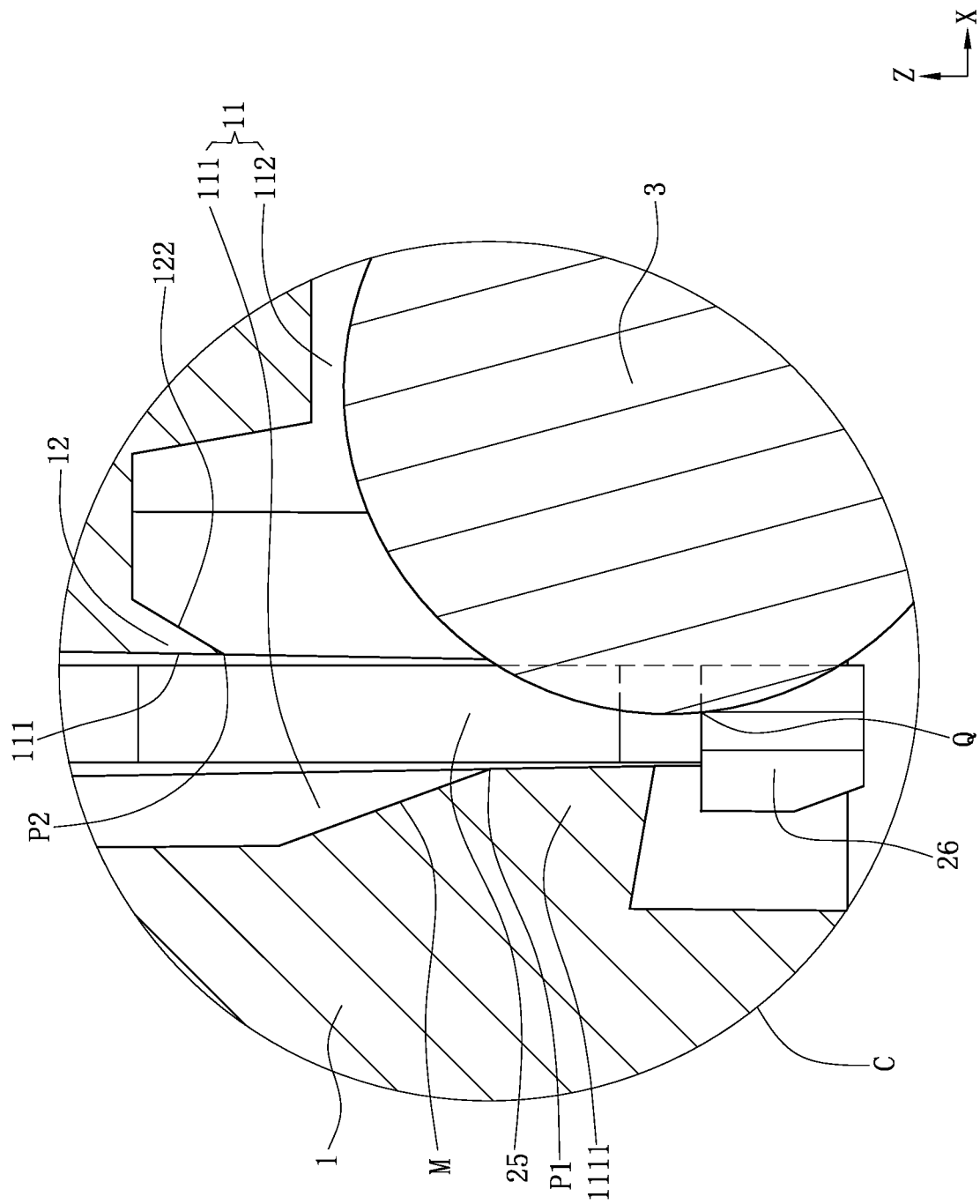
FIG. 12 is an enlarged view of a location C in FIG. 11.
Figure 13:
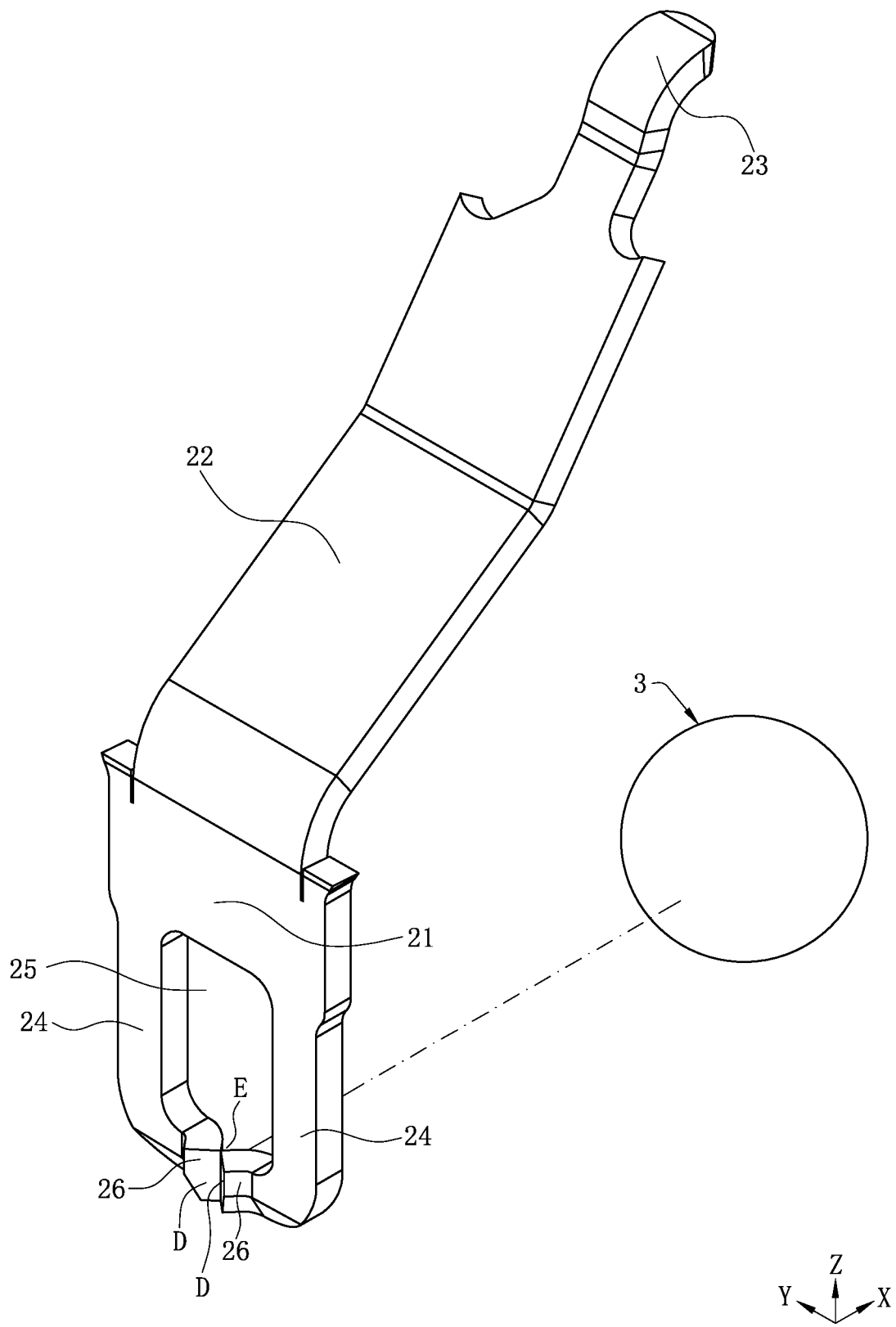
FIG. 13 is a perspective exploded view of a terminal and a solder ball of an electrical connector according to the second embodiment of the present invention.
Figure 14:
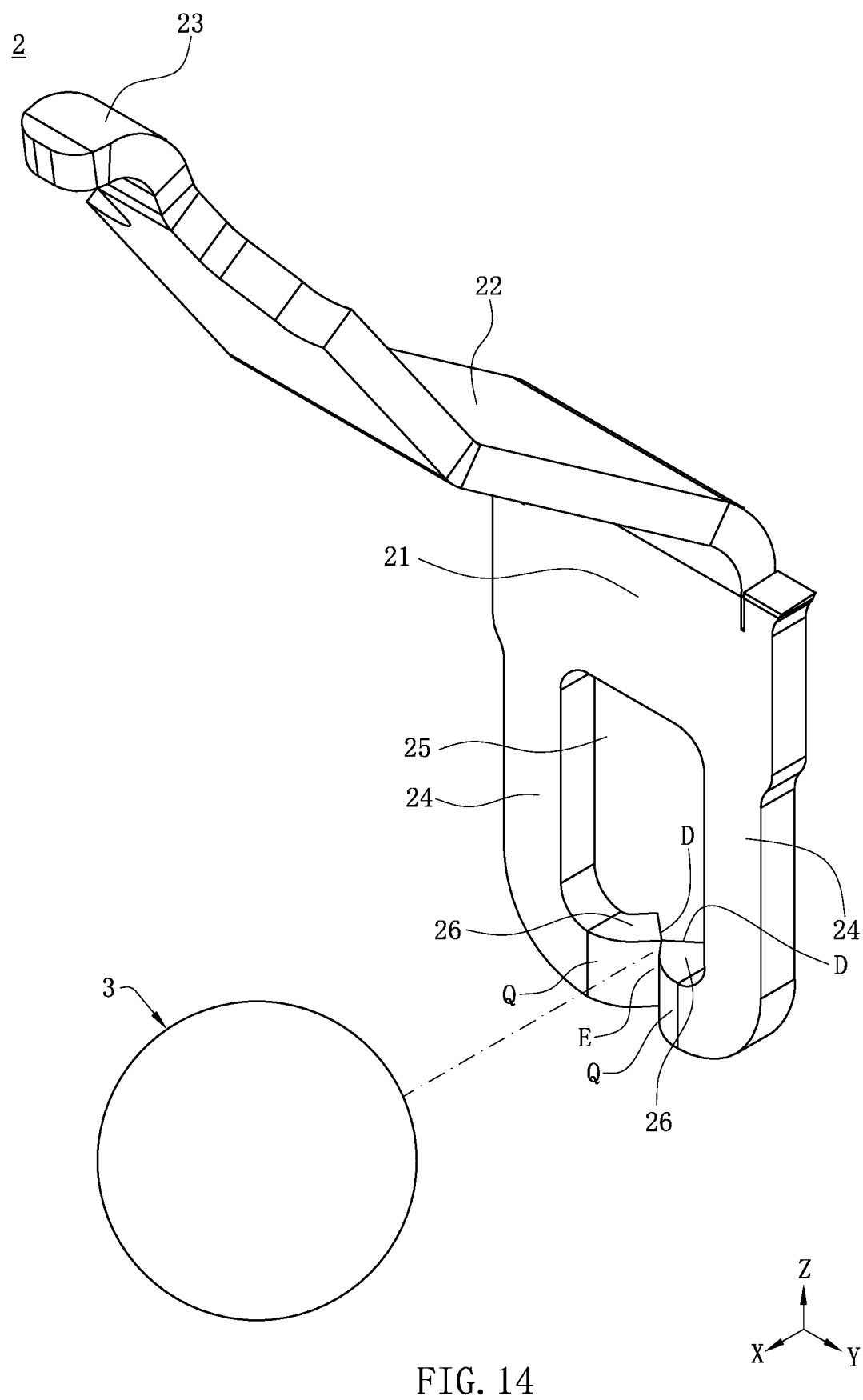
FIG. 14 is a perspective exploded view of a terminal and a solder ball of an electrical connector according to the second embodiment of the present invention in another viewing angle.
Figure 15:
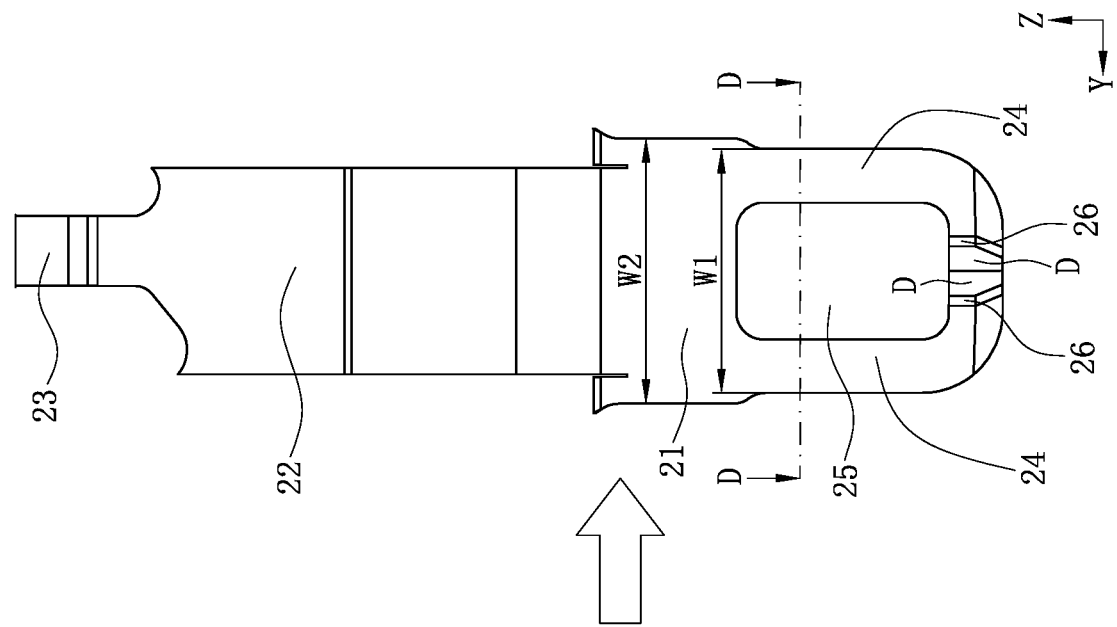
FIG. 15 is a schematic view of a bending process of the bending sections of a terminal of an electrical connector according to the second embodiment of the present invention.
Figure 15:
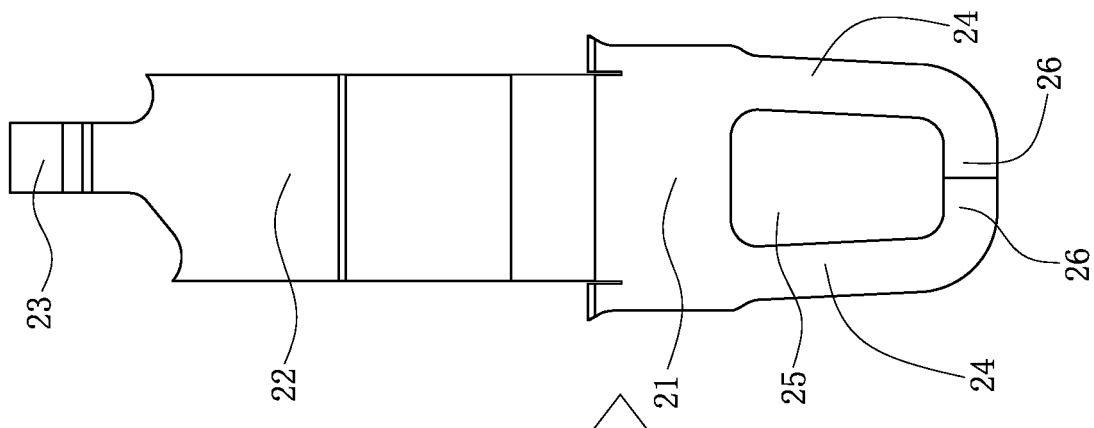
Figure 15:
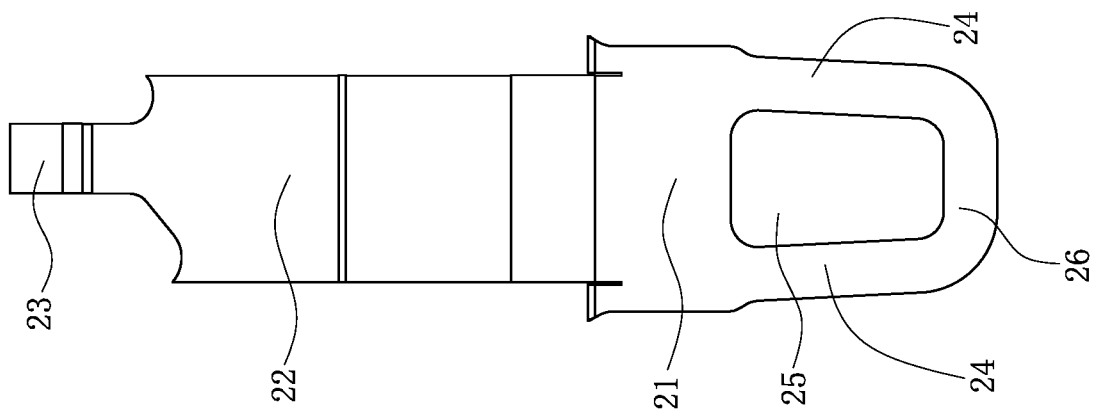
Figure 16:
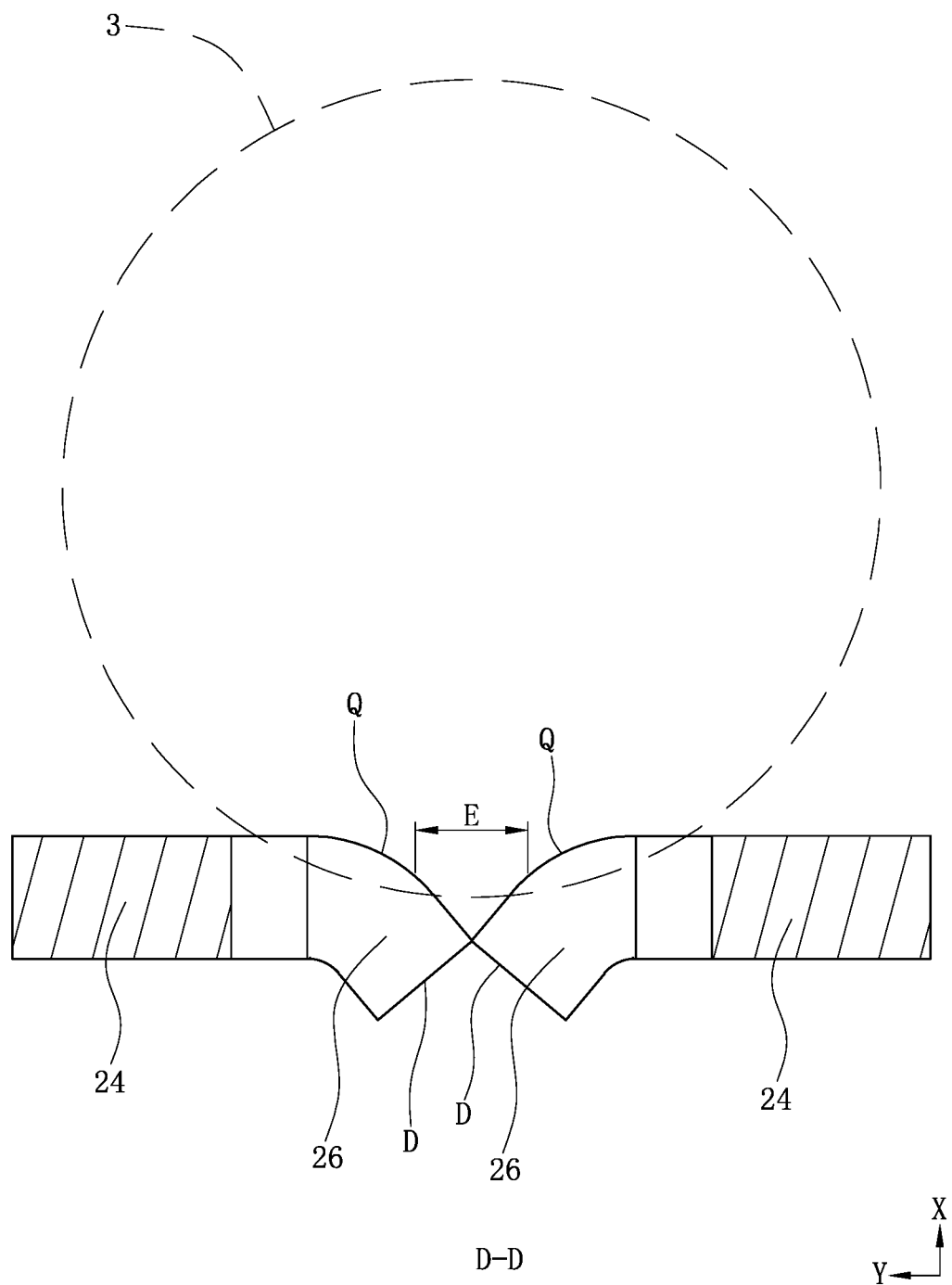
FIG. 16 is a sectional view of FIG. 15 along a D-D direction.

FIG. 9 to FIG. 12 show an electrical connector 100 according to a second embodiment of the present invention, which is different from the first embodiment in that: 1. the structure of the bending section 261 is different. In the second embodiment, as shown in FIG. 13, FIG. 14, FIG. 15 and FIG. 16, a top surface and a bottom surface of each of the two second soldering portions 26 both bend to form the bending section 261, the top surfaces and the bottom surfaces of the two bending sections 261 of each terminal 2 abut against each other (the top surfaces of the two bending sections 261 of each terminal 2 do not separate from each other), and the end surfaces D of the two bending sections 261 of each terminal 2 facing each other are vertical surfaces. 2. The structures of the ground terminals 2G are different. In the second embodiment, as shown in FIG. 10, each ground terminal 2G has four of the first soldering portions 24, lower ends of the two first soldering portions 24 in the middle thereof are broken from each other, and the elastic arm 22 is provided with a through slot 27 running through the thickness direction of the elastic arm 22. Other structures thereof are identical to those in the first embodiment, and are thus not further elaborated.

In sum, certain embodiments of the present invention have the following beneficial effects:
1. Each of the end portions of the two second soldering portions 26 facing each other respectively bends toward a direction away from the corresponding solder ball 3 to form a bending section 261 to abut against the corresponding solder ball 3, which is equivalent to the terminal forming a V-shaped structure to abut against the solder ball 3, and the bending section 261 abuts against the lower hemispherical surface of the corresponding solder ball 3, thereby ensuring the bending section 261 to stably abut against the solder ball 3, and the solder ball 3 does not easily fall. Meanwhile, the stopping block 1111 downward stops the bending section 261, and in assembling the solder ball 3, it may prevent the terminal 2 from moving upward and detaching from the insulating body 1. Since the bending section 261 is connected to the receiving slot 25, the height of the terminal 2 is reduced. Moreover, the bending section 261 abuts against the solder ball 3 and is stopped by the stopping block 1111 to prevent the terminal 2 from moving upward. In other words, the terminal 2 utilizes one portion to facilitate two functions, thereby reducing the volume of the terminal 2.
2. The lowest position P1 of the guiding surface M is lower than the lowest position P2 of the chamfer 12, such that the bending section 261 of the terminal 2, when passing the stopping block 111 in the process of being assembled downward into the first accommodating slot 111, may deform toward the second accommodating slot 112, thus preventing the bending section 261 from scratching the inner wall surface of the first accommodating slot 111, or preventing the bending section 261 from scratching the chamfer 12 and causing damages to the chamfer 12.
3. The insulating body 1 has an oblique surface 13 which is located right below the elastic arm 22, and the oblique surface 13 rises as the elastic arm 22 rises, such that the media at the front and rear sides of the elastic arm 22 becomes plastic instead of the air, thereby increasing the dielectric coefficient thereof, further reducing the impedances of the differential signal terminals 2S, and ensuring the transmission of the high frequency signals.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:
an insulating body, having a plurality of accommodating slots running therethrough along a vertical direction, wherein a side surface of each of the accommodating slots is provided with a stopping block; and
a plurality of terminals and a plurality of solder balls, correspondingly accommodated in the accommodating slots respectively, wherein each of the terminals has a flat plate portion located in a corresponding accommodating slot of the accommodating slots and two first soldering portions extending downward from the flat plate portion and abreast, a receiving slot is formed between the two first soldering portions, the flat plate portion and the two first soldering portions are coplanar, two second soldering portions extend toward each other from lower ends of the two first soldering portions, each of end portions of the two second soldering portion facing each other respectively bends toward a direction away from a corresponding solder ball of the solder balls to form a bending section, the bending section is located below the receiving slot and is connected to the receiving slot, a plate surface of the bending section facing the corresponding solder ball is defined as a matching surface, along the direction away from the corresponding solder ball, a gap between the two matching surfaces of the two bending sections of the two second soldering portions of each of the terminals becomes smaller, the corresponding solder ball is partially accommodated between the receiving slot and the two matching surfaces of the two bending sections of the two second soldering portions, the matching surface abuts against the corresponding solder ball and is located below a horizontal central plane of the corresponding solder ball, and the stopping block of the corresponding accommodating slot is located above the bending section to stop the bending section from moving upward.

2. The electrical connector according to claim 1, wherein the two bending sections of the two second soldering portions of each of the terminals abut against each other.

3. The electrical connector according to claim 1, wherein prior to bending the bending section, the two first soldering portions are close to each other along a downward direction from top thereof.

4. The electrical connector according to claim 1, wherein a top surface and a bottom surface of each of the two second soldering portions both bend to form the bending section.

5. The electrical connector according to claim 1, wherein bending locations of the two bending sections of the two second soldering portions of each of the terminals are close to each other along a downward direction from top thereof, and top surfaces of the two bending sections of the two second soldering portions of each of the terminals are separate from each other.

6. The electrical connector according to claim 1, wherein each of the accommodating slots comprises a first accommodating slot and a second accommodating slot, the first accommodating slot runs vertically through the insulating body, the second accommodating slot runs downward through the insulating body, each of the terminals is accommodated in the first accommodating slot of the corresponding accommodating slot, each of the solder balls is accommodated in the second accommodating slot of the corresponding accommodating slot, the insulating body is provided with a chamfer located between the first accommodating slot and the second accommodating slot, the first accommodating slot and the second accommodating slot are in communication with each other below the chamfer, the chamfer has a first side surface and a second side surface, the first side surface is connected to the first accommodating slot, the second side surface is connected to the second accommodating slot, and an included angle between the first side surface and the second side surface is less than or equal to 30°.

7. The electrical connector according to claim 6, wherein the stopping block is provided with a guiding surface being obliquely downward, the guiding surface guides each of the terminals to move downward, and a lowest position of the guiding surface is lower than a lowest position of the chamfer.

8. The electrical connector according to claim 1, wherein an elastic arm bends from the flat plate portion and extends upward, a contact portion is formed by extending upward from the elastic arm, and the contact portion is located in front of the flat plate portion; the insulating body has an oblique surface in front of the accommodating slots, the oblique surface is located right below the elastic arm, and the oblique surface gradually becomes higher along a forward direction from rear thereof.

9. The electrical connector according to claim 1, wherein each of the accommodating slots is provided with a stopping wall, the stopping wall is opposite to the stopping block, and the stopping wall and the two matching surfaces altogether abut against the corresponding solder ball.

10. The electrical connector according to claim 1, wherein the electrical connector is soldered to a circuit board, the circuit board is provided with a plurality of metal pads, the solder balls are soldered to the metal pads, a vertical central line of each of the metal pads is located between a vertical central line of each of the solder balls and one of the first soldering portions.

* * * * *